(12) United States Patent
Paul et al.

(10) Patent No.: US 9,219,712 B2
(45) Date of Patent: Dec. 22, 2015

(54) WAN OPTIMIZATION WITHOUT REQUIRED USER CONFIGURATION FOR WAN SECURED VDI TRAFFIC

(71) Applicant: Cisco Technology, Inc., San Jose, CA (US)

(72) Inventors: Arindam Paul, Sunnyvale, CA (US); Hui Wang, Sunnyvale, CA (US); Michael A. DeMoney, San Jose, CA (US); Arivu Ramasamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/970,916

(22) Filed: Aug. 20, 2013

(65) Prior Publication Data

US 2013/0339727 A1    Dec. 19, 2013

Related U.S. Application Data

(62) Division of application No. 13/271,948, filed on Oct. 12, 2011, now Pat. No. 8,516,240.

(51) Int. Cl.
*H04L 29/06* (2006.01)

(52) U.S. Cl.
CPC ............ *H04L 63/0428* (2013.01); *H04L 67/38* (2013.01); *H04L 63/205* (2013.01)

(58) Field of Classification Search
CPC ...... H04L 63/0428; H04L 67/38; G06F 21/00
USPC ......................................................... 713/153
See application file for complete search history.

(56) References Cited

U.S. PATENT DOCUMENTS

| | | | |
|---|---|---|---|
| 6,108,708 A | 8/2000 | Iwata | |
| 7,398,339 B1 | 7/2008 | Davis et al. | |
| 7,457,233 B1 | 11/2008 | Gan et al. | |
| 8,099,605 B1 * | 1/2012 | Billsrom et al. | 713/187 |
| 8,516,240 B1 | 8/2013 | Paul et al. | |
| 2004/0098511 A1 | 5/2004 | Lin et al. | |
| 2014/0013112 A1 * | 1/2014 | Cidon et al. | 713/165 |

* cited by examiner

*Primary Examiner* — Mohammad W Reza
(74) *Attorney, Agent, or Firm* — Merchant & Gould

(57) ABSTRACT

In order for intermediary WAAS devices to process and accelerate ICA traffic, they must decrypt the ICA traffic in order to examine it. Disclosed is a mechanism by which the ICA traffic may be re-encrypted for transport over the WAN in a manner that does not require explicit configuration by the administrator of the WAAS devices. For example, VDI traffic may be intercepted and all data redundancy elimination messages may be encrypted and sent to a peer network device.

20 Claims, 7 Drawing Sheets

WAN OPTIMIZATION WITHOUT REQUIRED USER CONFIGURATION FOR WAN SECURED VDI TRAFFIC

BACKGROUND

Desktop virtualization is an innovative application of virtualization that is reshaping the desktop industry. At the onset of server virtualization, pioneered by VMware, Tier 2/Tier 3 (and beyond) application servers constituted the bulk of virtualized workloads. Server virtualization has recently evolved beyond traditional server workloads to entire desktops running as virtual machines (VMs) on hypervisors. By one industry estimate 70 million desktops constituting ~16% of worldwide desktops will be virtualized by 2014. Hosted virtual desktops are being rapidly adopted by Enterprise and GET customers as well.

Desktop virtualization has profound implications for WAAS implementations. On one hand virtualized desktops reduce client→server traffic to a series of end-to-end encrypted and compressed screen scrapes. The network sees less and less and is hence able to offer fewer services (e.g. QoS, security etc)—hence being reduced to dumb plumbing. On the other hand, because every keyboard stroke and every mouse click must make its way through the network, the network becomes more critical than ever and must be highly available and robust to accommodate the extra bandwidth requirements.

In order for intermediary WAAS devices to process and accelerate ICA traffic, they must decrypt the ICA traffic in order to examine it. There is a need for a mechanism by which the ICA traffic may be re-encrypted for transport over the WAN in a manner that does not require explicit configuration by the administrator of the WAAS devices.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
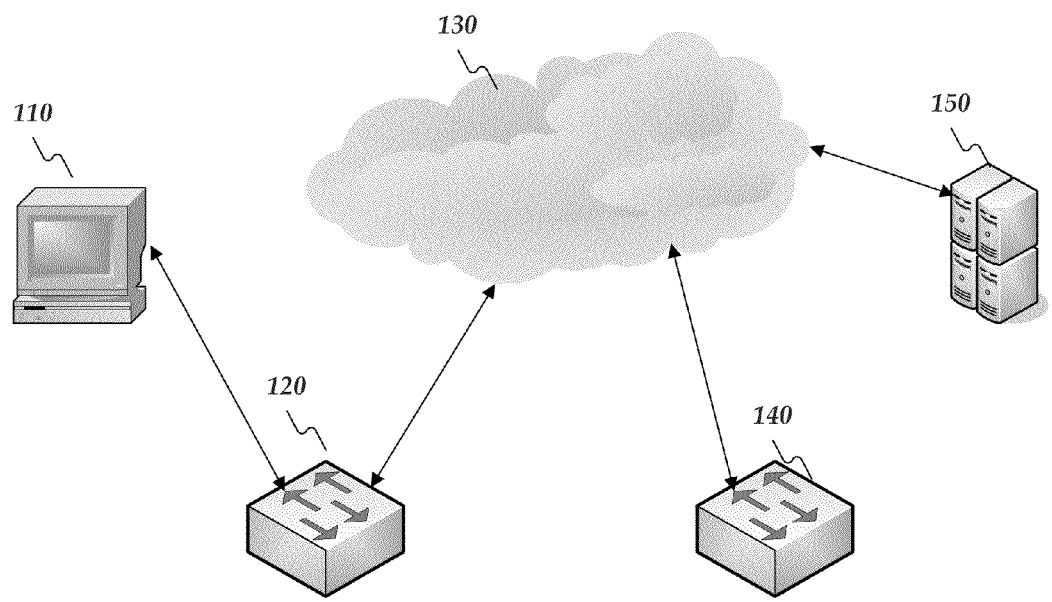
FIG. 1 illustrates an example network environment for embodiments of this disclosure.

Consistent with embodiments of the present disclosure, systems and methods are disclosed for providing acceleration and secure WAN transport of ICA and CGP traffic without requiring explicit configuration of security parameters by an administrator of the WAAS device.

It is to be understood that both the foregoing general description and the following detailed description are examples and explanatory only, and should not be considered to restrict the application's scope, as described and claimed.

Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates an example network environment for embodiments of this disclosure. A client 110 may be in communications with a network device 120. Network device 120 may be running Wide Area Application Services ("WAAS"). In some embodiments, client 110 may be an ICA client such as a CITRIX ICA client.

Network device 120 may communicate to any number of other network devices across a WAN 130. In some embodiments, WAN 130 may comprise the Internet. Specifically, network device 120 may be in communication with a network device 140. Again, network device 140 may be a WAAS network device.

Network device 140 may communicating with a server device 150. In some embodiments, server device 150 may be a CITRIX XenApp server. There is a need for a higher level of security on WAN 130 in this example. Embodiments described herein provide this higher level of security while avoiding additional configuration.

In order for network device 120 and network device 140 to process and accelerate ICA traffic, the ICA traffic must be decrypted and examined. Embodiments described herein provide for a mechanism by which the ICA traffic may be re-encrypted for transport over WAN 130 in a manner that does not require explicit configuration by the administrator of the WAAS devices 120 and 140.

Embodiments of the present disclosure provide for secure remote desktop display protocol on WAN 130 by default. Normally for WAN optimization, the encrypted Virtual Desktop Infrastructure ("VDI") traffic may have to be decrypted to achieve data de-duplication before being forwarded to WAN 130. After decryption, most WAN optimization vendors send the VDI traffic as clear text across WAN 130 by default. While the WAN optimization vendors may allow customers to use IPSec to protect VDI traffic, this approach requires significant configuration to enable IPSec tunneling on WAN optimization appliances in both a branch and a data center.

Embodiments of the present disclosure provide for a guarantee that there will be no clear text over WAN 130 if the original VDI traffic is encrypted or obfuscated at any level. When a WAAS device, such as network device 120 intercepts a new VDI connection, the WAAS device may symmetrically plumb WAN secure resources on itself and its peer device.

The plumbing process ensures that all WAAS Data Redundancy Elimination ("DRE") messages on the connection may be encrypted before being sent over WAN 130. As such, the peer WAAS device, such as network device 140, will be able to decrypt the DRE messages. To guarantee secured VDI traffic over WAN 130, embodiments of the present disclosure enforce auto-plumbing upon connection setup.

If the auto-plumbing fails (i.e., WAN secure resources are not available on any the network devices), the VDI connection may not be optimized by the WAAS device. If the plumbing is successful (i.e., WAN secure resources are available) the VDI connection may be optimized by the WAAS device with guaranteed WAAS security. The strength of encryption on WAN 130 may then be the same or stronger than the strength of encryption for the original display protocol.

In some embodiments, the solution handles a plurality of encryption levels. The encryption levels may include a basic encryption level. The basic encryption level may be an obfuscation equivalent to typical ICA obfuscation applied to data transferred over WAN 130. A second encryption level may include RC5 encryption (with equivalent keys of 128, 56, or 40 bits). In this scenario, RC5 encryption may be applied to data transferring over WAN 130. In some embodiments, a configuration interface may be employed to allow for customized secure strength up to AES 256 bit for any level of encryption.

Embodiments of the present disclosure reduce the latency of setting up the secure communication over WAN 130 through the use of an overlapping mechanism. For example, based on the characteristics of ICA packets, two channels may be overlapped: the clear channel and the application channel.

The initialization ICA packets may originally be sent as clear text. Embodiments herein may send these initialization ICA packets across the clear channel without encryption. The encryption algorithm information may then be exchanged between WAAS peers, such as network device 120 and network device 140, to set up the application channel. Thus, the latency required to set up secure communication over WAN 130 for non-initialization ICA packets is overlapped when the initialization ICA packets are transferred.

In some embodiments communications may occur between a particular ICA client, such as client 110 and a XenApp server, such as server 150. These communications may be referred to collectively as a session. The exchange of messages carried during the lifetime of the session may be transported by a TCP connection established between client 110 and server 150.

As the network links between client 110 and server 150 may be unreliable from time to time, it is possible that the TCP connection carrying a session may fail. As such, to continue the session, it may be necessary to establish a new TCP session. During the lifetime of a session there may be a sequence of TCP connections used to transport the session.

As VDI traffic flows via TCP between client 110 and server 150, it may be intercepted at the TCP/IP level and processed by an intermediate network device, such as network device 120 to transform the data to be more efficiently transported across WAN 130. The transformation process may entail decrypting, parsing, and re-encrypting the messages passed between client 110 and server 150.

In some embodiments, a state must be maintained in the network devices that is specific to the particular VDI session that has been established. The state may include the state of encryption, decryption, and the state of the parser which may be parsing the data exchanged between client 110 and server 150.

The process of intercepting and transforming the traffic may be accomplished by establishing independent encryption contexts between each pair of parties along the communications path. For example, independent encryption may exist between client 110 and network device 120 and between network device 140 and server 150. As the encryption contexts are independent once the encryption contexts have been established, client 110 may not be able to directly interact with server 150. As such, the network devices must be present to encrypt and decrypt between the independent encryption contexts.

The state maintained by the network devices pertains not only to the current TCP connection, but to the session globally. The state may need to be preserved and accessible across the entire sequence of TCP connections which make up the active session between client 110 and server 150.

Embodiments of this disclosure describe mechanisms to ensure that the subsequent TCP connections are routed to the same plurality of network devices. The network devices will be able to accept and process the subsequent TCP connection of the session.

Furthermore, embodiments of this disclosure describe a mechanism to ensure that should interception by the same network devices not be possible, that server 150 and the intermediate network devices will reliably recognize the situation. Recognizing the situation may result in preventing erroneous operation due to a mismatch of encryption contexts.

Parsing states and cryptographic information maintained on a network device, such as network device 120, may be specific for each VDI session. As such, they need to be maintained across the sequence of TCP connections associated with the session.

In some embodiments, there may be multiple connections bound to a VDI session sequentially. The ICA protocol may be wrapped for session reliability. This may allow an ICA session to exist over multiple sequential TCP connections. In this case, new connections may be re-bound to the existing session state in the event of a failure in the previous TCP connection.

Alternatively, in some embodiments, multiple connections simultaneously bound to a single VDI session, such as in the case of the CITRIX multi-stream ICS. Here, one VDI session may be may be associated with multiple connections. For example, a master connection may have a plurality of associated TCP connections. Here, when the first connection of a multiple stream session arrives, additional connections may be reserved in the connection pool at that time to ensure that the remaining TCP connections making up that session will be available.

Embodiments of this disclosure may further ensure that routing of traffic between client 110 and server 150 will be intercepted by the same pair of WAAS devices. This may be accomplished by the construction of load distribution rules for connection interception of traffic. The interception of traffic may be done by a designated WAN optimization appliance based on a deterministic mapping between the IP addresses of client 110 and server 150 and their associated ports to select the specific WAAS device from those available.

Some embodiments may ensure that client 110 and server 150 can reliably detect a situation where the session may not continue. Continuation may be impossible as client 110 and server 150 may be operating in different encryption contexts. Such situations may also occur due to device failure, device overload, network topology changes, etc.

The session identification value may be deterministically modified from its originally determined value. The modification may result in client 100 and server 150 identifying a particular session with differing session identification values. If an un-intercepted reconnect occurs during a session (such as a CGP reconnect during a CGP session) that was previously intercepted, client 110 may present the session identification value as modified by a WAAS device. This session identification value will not match the unmodified session identification value stored at server 150. The reconnect will thus be rejected by server 150. This avoids the possibility of mishandling incorrectly decrypted data.

Embodiments of this disclosure describe intelligent connection reservation to prevent escaped connections if overflow occurs on a network device. Intelligent connection reservation may ensure that resources on the network device required to establish a TCP connection to continue the session are available.

In embodiments where there may be multiple connections bound to a VDI session sequentially, a connection pool may be reserved in advance on the WAAS device. The reserved connections may act as a placeholder in case the existing connections disconnect and additional connections which are a continuation of the existing session.

The connection pool may guarantee that the connections which are continuations of existing sessions are not rejected for lack of resources. The connection pool size may be dynamically adjusted according to the statistics associated with the re-bind rate per VDI session. This may cost-efficiently ensure that connections to existing VDI sessions are handled in a manner to prevent erroneous operation by either client 110 or server 150.

Figure 2:
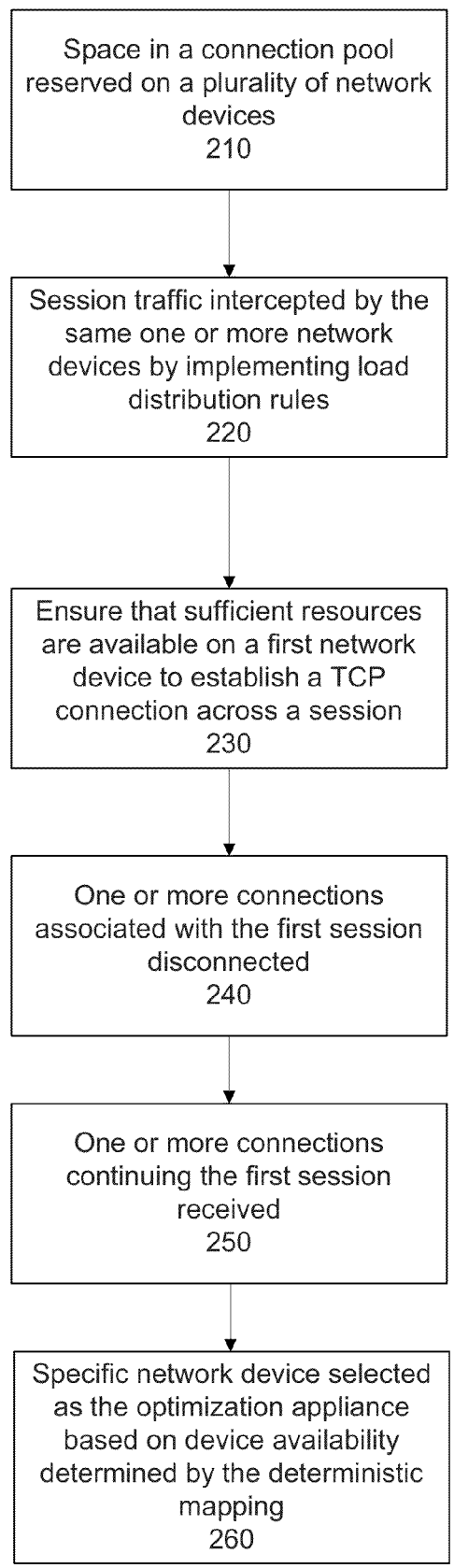
FIG. 2 is a flow chart illustrating embodiments of this disclosure.

FIG. 2 is a flow chart illustrating embodiments of the present disclosure. Method 200 may begin at step 210 where space in a connection pool may be reserved on a plurality of network devices, wherein the connection pool manages reservations for a plurality of connections associated with a session. In some embodiments, the session may be a VDI session.

Method 200 may then proceed to step 220. At step 220 session traffic may be intercepted by the same one or more network devices by implementing load distribution rules. The load distribution rules may be based on a deterministic mapping from a client network device IP address to a service network device IP address.

As part of the implementation of the load distribution rules, method 200 may proceed to step 230 where it is ensured that sufficient resources are available on a first network device to establish a TCP connection across a session traversing a plurality of network devices. In some embodiments, the first network device may be a WAAS network device.

Method 200 may further proceed to step 240. At step 240, one or more connections associated with the first session may be disconnected for a variety of reasons. Method 200 may then proceed to step 250. At step 250, one or more connections continuing the first session may be received.

The one or more connections continuing the first session may be added by using resources reserved by the connection pool. In some embodiments, dynamically adjusting the size of the connection pool based on network statistics. The network statistics may comprise at least the re-bind rate per session as well as other network statistics.

In some embodiments of method 200, inactive connections may be removed from the connection pool after a predetermined period of inactivity. Method 200 may proceed to step 260, where a specific network device may be selected as the optimization appliance based on device availability determined by the deterministic mapping.

Figure 3:
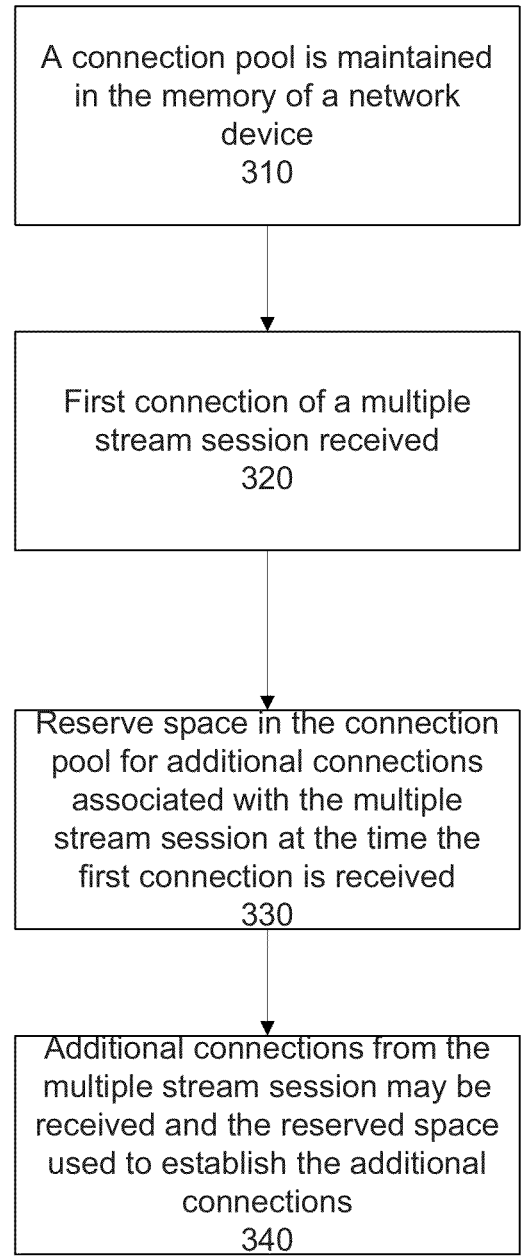
FIG. 3 is a flow chart illustrating embodiments of this disclosure.

FIG. 3 is a flow chart illustrating embodiments of the present disclosure. Method 300 may begin at step 310 where a connection pool is maintained in the memory of a network device. Method 300 may proceed to step 320. At step 320, a first connection of a multiple stream session may be received.

At step 330, method 330 may reserve space in the connection pool for additional connections associated with the multiple stream session at the time the first connection is received. At step 340, additional connections from the multiple stream session may be received; the reserved space may be used to establish the additional connections. In some embodiments, the additional connections may be TPC connections.

It should be ensured that that routing of subsequent traffic on the multiple stream session will be intercepted by the same plurality of WAAS network devices. This may be accomplished by applying a set of pre-determined load distribution rules to ensure the routing of subsequent traffic on the multiple stream session will be intercepted by the same plurality of WAAS network devices.

Figure 4:
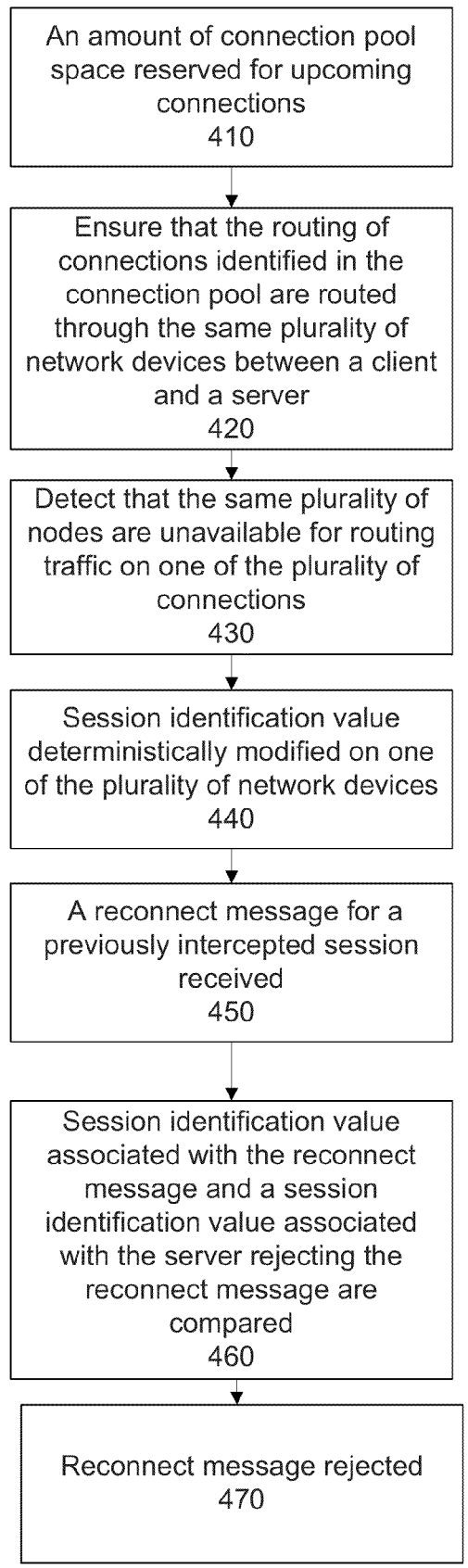
FIG. 4 is a flow chart illustrating embodiments of this disclosure.

FIG. 4 is a flow chart illustrating embodiments of the present disclosure. Method 400 may begin at step 410 where an amount of connection pool space may be reserved for upcoming connections. Next, at 420 it may be ensured that the routing of connections identified in the connection pool are routed through the same plurality of network devices between a client and a server.

Method 400 may proceed to step 430. At step 430, it may be detected that the same plurality of nodes are unavailable for routing traffic on one of the plurality of connections. When this detection occurs, method 400 may proceed to step 440 where a session identification value may be deterministically modified on one of the plurality of network devices. In some embodiments, the modification results in the client and the server identifying the active session result in different session identifiers. In some embodiments, the plurality of nodes may be WAAS devices Method 400 may proceed to step 450 where a reconnect message for a previously intercepted session may be received. Method 400 may then proceed to step 460. At step 460, a session identification value associated with the reconnect message and a session identification value associated with the server rejecting the reconnect message may be compared.

If the session identification value associate with the reconnect message and the session identification value associated with the server do not match, method 400 may proceed to step 470 where the reconnect message may be rejected.

Figure 5:
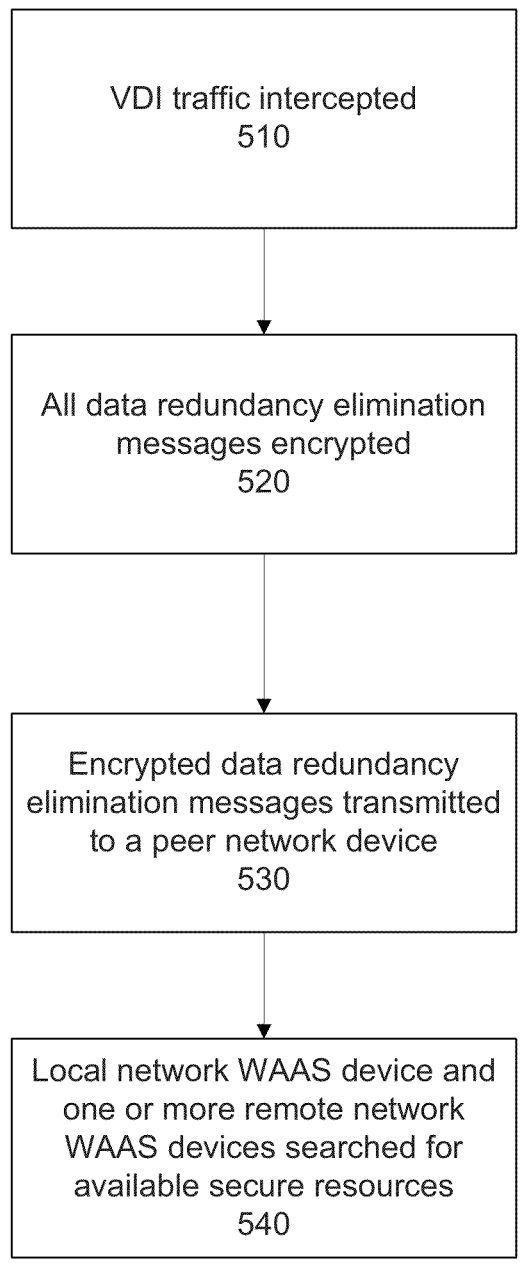
FIG. 5 is a flow chart illustrating embodiments of this disclosure.

FIG. 5 is a flow chant illustrating embodiments of this disclosure. Method 500 may begin at step 510, where VDI traffic may be intercepted. In some embodiments, the VDI traffic is intercepted by a local network WAAS device. Method 500 may then proceed to step 520. At step 520, all data redundancy elimination messages may be encrypted. In some embodiments, the strength of encryption of the data redundancy elimination messages is the same or better than the strength of encryption of the original display protocol.

Method 500 may then proceed to step 530 where the encrypted data redundancy elimination messages may be transmitted to a peer network device. In some embodiments, the encrypted redundancy elimination messages may be decrypted at the peer network device. Next, at step 540, the local network WAAS device and one or more remote network WAAS devices may be searched for available secure resources. In some embodiment, the secure resources may include one or more keys.

Embodiments may support multiple levels of encryption for encrypting all data redundancy elimination messages. The multiple levels may comprise at least a basic encryption level and a higher complexity encryption level, wherein the higher complexity level comprises employing RC5 encryption.

Embodiments may further provide for a configuration interface. The configuration interface may allow for customized encryption up to AES 256-bit as selected by a user.

Figure 6:
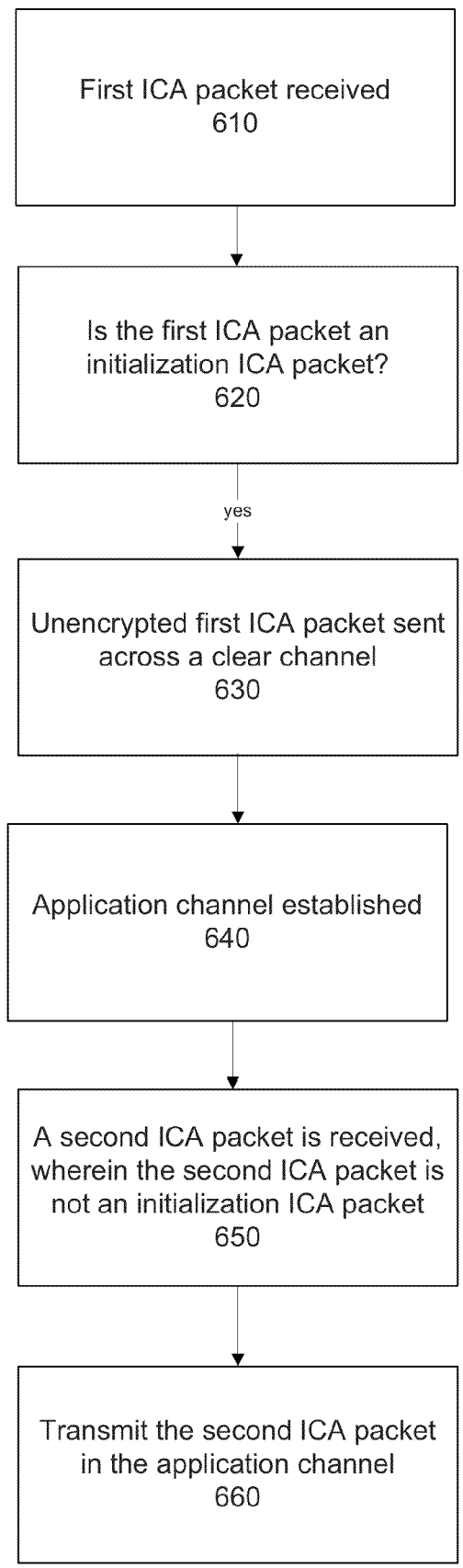
FIG. 6 is a flow chart illustrating embodiments of this disclosure.

FIG. 6 is a flow chart illustrating embodiments of the disclosure. Method 600 may start at step 610 where a first ICA packet may be received. Method 600 may then proceed to step 620. At step 620, it may be determined if the first ICA packet is an initialization ICA packet. If the first ICA packet is an initialization ICA packet, method 600 proceeds to step 630. At step 630, the unencrypted first ICA packet may be sent across a clear channel.

Method 600 may then proceed to step 640 where an application channel may be established. In some embodiments, establishing the channels may comprise exchanging information with a remote network device; and establishing the channel based on the exchanged information. The exchanged information may comprise encryption algorithm information. The encryption algorithm information may be stored on the memory of a network device, such as a WAAS device.

Next, at step 650, a second ICA packet may be received, wherein the second ICA packet is not an initialization ICA packet. As such, method 600 may proceed to step 660 and transmit the second ICA packet in the application channel.

Figure 7:
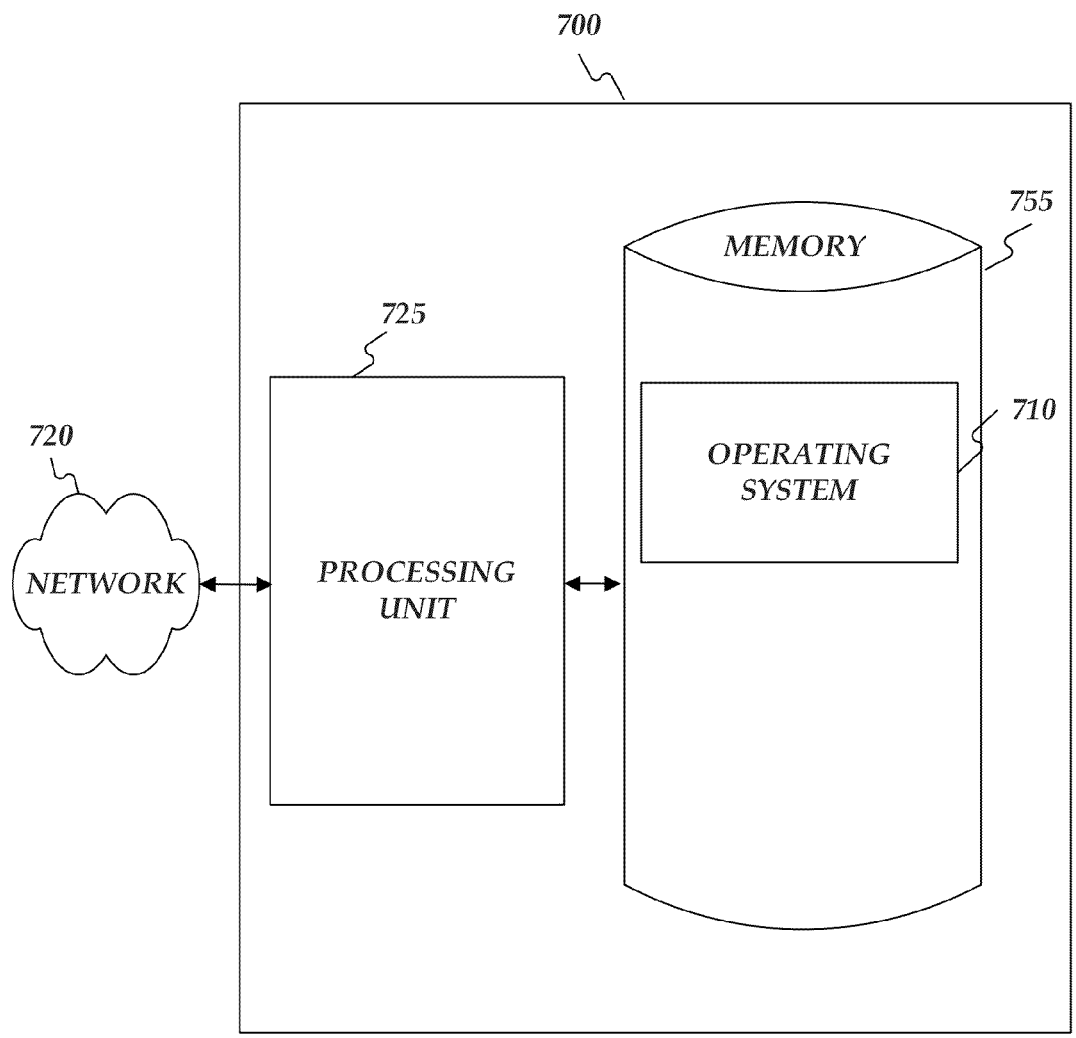
FIG. 7 is a block diagram of a computing network device.

FIG. 7 illustrates a network device, such as computing device 700. Computing device 700 may include processing unit 725 and memory 755. Memory 755 may include software configured to execute application modules such as an operating system 710. Computing device 1700 may execute, for example, one or more stages included in the methods as described above. Moreover, any one or more of the stages included in the above describe methods may be performed on any element shown in FIG. 7.

Computing device 700 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
   intercepting Virtual Desktop Infrastructure ("VDI") traffic;
   encrypting all data redundancy elimination messages received in the VDI traffic; and
   sending the encrypted data redundancy elimination messages to a peer network device.

2. The method of claim 1, wherein the VDI traffic is intercepted by a local network Wide Area Application Services ("WAAS") device.

3. The method of claim 2, further comprising:
   searching the local network WAAS device for available secure resources; and
   searching a remote network WAAS device for available secure resources.

4. The method of claim 3, further comprising:
   decrypting the encrypted data redundancy elimination messages at the peer network device.

5. The method of claim 3, wherein the available secure resources include one or more keys.

6. The method of claim 3, wherein a strength of encryption of the data redundancy elimination messages is the same or better than a strength of encryption of an original display protocol.

7. The method of claim 3, further comprising:
   supporting multiple levels of encryption for encrypting all data redundancy elimination messages.

8. The method of claim 7, wherein the multiple levels of encryption comprise at least a basic encryption level and a higher complexity encryption level.

9. The method of claim 8, wherein the higher complexity encryption level comprises employing RC5 encryption.

10. The method of claim 9, further comprising providing a configuration interface.

11. The method of claim 10, wherein the configuration interface allows for customized encryption up to AES 256-bit.

12. A method comprising:
    receiving traffic comprising a plurality of Independent Computing Architecture ("ICA") packets and redundancy elimination messages;
    establishing an application channel;
    transmitting received ICA packets across a clear channel if the received ICA packets are initialization ICA packets;
    transmitting received ICA packets across the application channel if the received packets are not initialization ICA packets;
    encrypting all redundancy elimination messages; and
    transmit the redundancy elimination messages across the application channel.

13. The method of claim 12, further comprising:
exchanging information with a remote network device; and
establishing the application channel based on the exchanged information.

14. The method of claim 13, wherein the exchanged information comprises encryption algorithm information.

15. The method of claim 14, further comprising storing a plurality of encryption algorithms associated with different levels of encryption.

16. An apparatus comprising:
a memory;
a processor capable of executing operations stored in memory comprising:
intercepting Virtual Desktop Infrastructure ("VDI") traffic;
encrypting all data redundancy elimination messages in the VDI traffic; and
sending the encrypted data redundancy elimination messages to a peer network device.

17. The apparatus of claim 16, the processor further capable of executing instructions comprising:
searching a local network Wide Area Application Services ("WAAS") device for available secure resources; and
searching a remote network WAAS device for available secure resources.

18. The apparatus of claim 17, the processor further capable of executing instructions comprising decrypting the encrypted data redundancy elimination messages at the peer network device.

19. The apparatus of claim 17, the processor further capable of executing instructions comprising supporting multiple levels of encryption for encrypting all data redundancy elimination messages.

20. The apparatus of claim 19, wherein the multiple levels of encryption comprise at least a basic encryption level and a higher complexity encryption level.

* * * * *